(12) United States Patent
Gaponoff (10) Patent No.: US 7,412,444 B2
(45) Date of Patent: Aug. 12, 2008

(54) EFFICIENT INDEXING OF HIERARCHICAL RELATIONAL DATABASE RECORDS

(75) Inventor: Mark Gaponoff, Mercer Island, WA (US)

(73) Assignee: IDX Systems Corporation, Burlington, VT (US)

( * ) Notice: Subject to any disclaimer, the term of this patent is extended or adjusted under 35 U.S.C. 154(b) by 308 days.

(21) Appl. No.: 11/056,379

(22) Filed: Feb. 10, 2005

(65) Prior Publication Data

US 2005/0198017 A1 Sep. 8, 2005

Related U.S. Application Data

(60) Provisional application No. 60/544,015, filed on Feb. 11, 2004.

(51) Int. Cl.
*G06F 17/30* (2006.01)

(52) U.S. Cl. .................. 707/7; 707/5; 707/6; 707/8

(58) Field of Classification Search ............... 707/1–10, 707/104.1
See application file for complete search history.

(56) References Cited

U.S. PATENT DOCUMENTS

| | | | | |
|---|---|---|---|---|
| 5,121,493 A * | 6/1992 | Ferguson | ................... | 707/7 |
| 5,201,048 A * | 4/1993 | Coulter et al. | ................... | 707/3 |
| 6,181,678 B1 * | 1/2001 | Ha-Duong et al. | ................... | 370/235 |
| 6,185,557 B1 * | 2/2001 | Liu | ................... | 707/4 |
| 6,334,125 B1 * | 12/2001 | Johnson et al. | ................... | 707/3 |
| 6,480,849 B1 * | 11/2002 | Lee et al. | ................... | 707/8 |
| 6,571,244 B1 * | 5/2003 | Larson | ................... | 707/7 |
| 6,684,222 B1 * | 1/2004 | Cornelius et al. | ................... | 707/104.1 |
| 6,957,205 B1 * | 10/2005 | Liongosari | ................... | 706/45 |
| 7,069,272 B2 * | 6/2006 | Snyder | ................... | 707/102 |
| 2005/0065910 A1 * | 3/2005 | Welton et al. | ................... | 707/2 |

OTHER PUBLICATIONS

Screen Shot for Mercury TestDirector 8.0, Mercury, Oct. 26, 2005.

* cited by examiner

*Primary Examiner*—Don Wong
*Assistant Examiner*—Hanh B Thai
(74) *Attorney, Agent, or Firm*—Andrus, Sceales, Starke & Sawall, LLP (57) ABSTRACT

According to various embodiments, systems, and methods, a sorting construct (TREE_SORT) is generated to efficiently traverse hierarchical data structures in relational databases. A TREE_SORT construct is generated by transforming a value that represents the sequential order of a given node relative to its siblings (Peer_Sequence) to a left-justified string of a given width. A TREE_SORT value for the parent of a given node is prepended to the left of the generated substring of the transformed Peer_Sequence value. As a result, a sorting construct of the parent node sorts before sorting constructs of child nodes.

17 Claims, 3 Drawing Sheets

EFFICIENT INDEXING OF HIERARCHICAL RELATIONAL DATABASE RECORDS

CROSS REFERENCE TO RELATED APPLICATIONS

This application claims the benefit of U.S. Provisional Application No. 60/544,015, entitled "Efficient Indexing Of Hierarchical Relational database Entries", filed Feb. 11, 2004, which is incorporated by reference herein.

BACKGROUND

1. Field of the Invention

This invention relates in general to storing hierarchical data structures in relational databases, and more particularly, to efficient indexing of hierarchical data structures in relational databases.

2. Background Art

Figure 1:
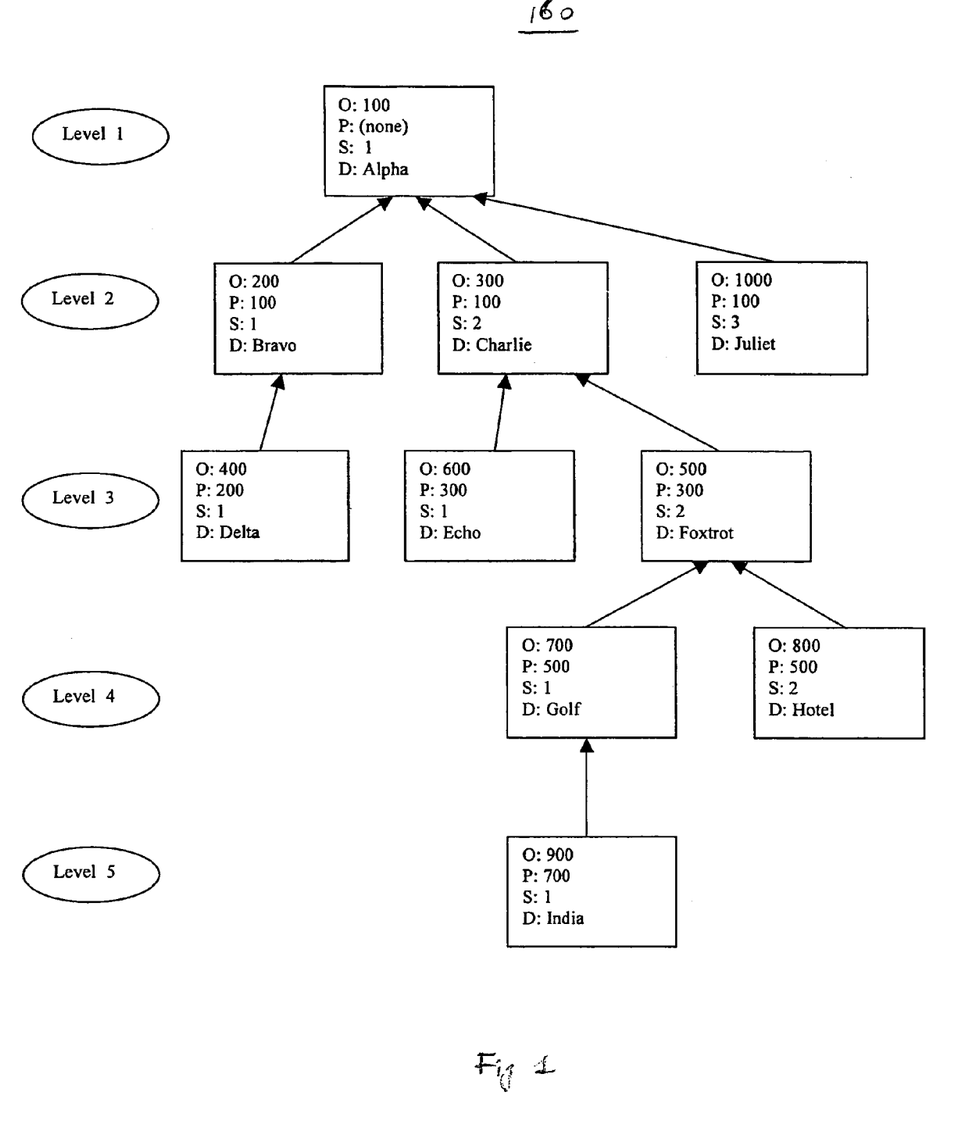
FIG. 1 is an exemplary hierarchical tree data structure.

Hierarchical data structures, such tree data structures, are commonly used to represent data. Tree data structures are made of nodes, which can contain both data to be stored and pointers to other nodes in the tree. The terms "hierarchical data structure", "tree data structure" and "tree" are used interchangeably throughout this disclosure. Nodes in a tree structure are in an ancestor-child relationship. A root node is the topmost node that has no ancestor nodes. A tree structure also has leaf nodes and internal nodes. An internal node is a node that has one or more child nodes. A leaf node has no children. All children of the same node are siblings. Referring now FIG. 1, an exemplary tree data structure 160 is shown. In FIG. 1, node "Alpha" is a root node that has the following three children: "Bravo", "Charlie", and "Juliet". Since Bravo, Charlie, and Juliet are children of the same parent, Alpha, these nodes are siblings (or 'peers'). In the tree structure shown in FIG. 1, each node is identified by its unique ID (OID), the unique ID of its Parent_OID), and its sequential number among siblings (Peer_Sequence).

It has become commonplace to represent hierarchical data structures in relational databases. An example of a relational database representation of the tree structure illustrated in FIG. 1 is shown below in Table 1.

TABLE 1

Database Representation of Tree Data Structure 160

| OID | Parent_OID | Peer_Sequence | LEVEL | DATA |
|-----|------------|---------------|-------|------|
| 100 | NULL | 1 | 1 | Alpha |
| 200 | 100 | 1 | 2 | Bravo |
| 300 | 100 | 2 | 2 | Charlie |
| 400 | 200 | 1 | 3 | Delta |
| 600 | 300 | 1 | 3 | Echo |
| 500 | 300 | 2 | 3 | Foxtrot |
| 700 | 500 | 1 | 4 | Golf |
| 800 | 500 | 2 | 4 | Hotel |
| 900 | 700 | 1 | 5 | India |
| 1000 | 100 | 3 | 2 | Juliet |

Table 1 stores a plurality of records. Each record is associated with a node in the tree data structure and includes a plurality of fields. An exemplary record shown in Table 1 includes a DATA field that stores data associated with a particular node in the data structure, and OID, Parent_OID, Peer_Sequence, and Level fields.

The OID field stores a unique object ID of a given node. An object ID can be any value that uniquely identifies the node. In a preferred embodiment, OID is a numeric value.

The Parent_OID field stores a pointer or reference to the parent of the node. When the node is a root node, it has no parent. In one implementation, the value of Parent_OID for the root node is NULL or a null-like value, such as zero.

The Peer_Sequence field stores an index value identifying the sequential order of a node relative to its siblings. Peer_Sequence can be any value capable of being transformed into a constant-width string. In a preferred embodiment, Peer_Sequence can be any numeric value. The Peer_Sequence of the first node among siblings of the same parent can also indicate the interval by which Peer_Sequence of a subsequent sibling will be incremented. For example, if the numeric Peer_Sequence value of the first sibling is "10", Peer_Sequence for each subsequent sibling node is incremented by "10".

The LEVEL field stores the sequential number of the level at which the node is located in the hierarchy. A hierarchical data structure can include any number of levels. The value of LEVEL is derived from the position of the node in the hierarchy.

The DATA field stores the value of the data associated with a given node. It could actually represent a collection of fields associated with each node.

A database user often needs to examine relationships across multiple levels of the tree hierarchy or needs to identify the next node following a given node in the hierarchy. One of the largest drawbacks of a relational database is its inability to handle queries efficiently. For example, to answer a question like "Is India a descendant of Charlie?" in the tree data structure shown in FIG. 1, one would have to perform a pointer chain traversal by iteratively traversing nodes in the tree data structure using a reference to the parent node. This process involves issuing several queries or joins within one query to find out if the PARENT_OID of India is the OID of Charlie, or if the PARENT_OID of the PARENT_OID of India is the OID of Charlie, etc. until the top of the hierarchy is reached. Below are sample SQL queries that need to be executed to perform the pointer-chain traversal of a data structure.

```
Now = India
While (up.PARENT_OID is not null) and
(up.PARENT_OID <> Charlie.OID)
Do
{
select up.PARENT_OID from A_TREE now,
A_TREE up where up.OID =
now.PARENT_OID;
up = now
}
If up.PARENT_OID is null, India is NOT a
descendent of Charlie, otherwise it is.
```

This query is executed multiple times until a match is found or the root node in the tree structure is reached. To search more efficiently, one query that combines the previous queries can be issued. The problems with the above solution are that they either require an iterative series of queries of unknown length or a single complex and inefficient query.

Often, it is desirable to represent a tree data structure in a tree display similar to a computer directory tree structure, showing the hierarchy of the nodes, such as the one shown below:
Alpha
+Bravo
++Delta
+Charlie
++Echo
++Foxtrot +++Golf
++++India
+++Hotel
+Juliet In this example, the '+' signs prefixing the DATA name indicate that a given node is an immediate child of the nearest preceding node in the data structure with fewer (or no) '+' signs. The existing solutions for ordering a hierarchical data structure have been left for programmers since this type of ordering cannot be accomplished with a single SQL query.

Accordingly, there is a need for a mechanism that provides for more efficient traversal of hierarchical data structures and avoids the complexities of prior art techniques.

DISCLOSURE OF THE INVENTION

The above need is met by a sorting construct (TREE_SORT), which is an index added to a relational database that stores hierarchical data structures. Adding the sorting construct provides for efficient use of sorting-type functions of the structured query language (SQL) to traverse among multiple levels of hierarchical data structures.

According to one embodiment of the present invention, to generate the TREE_SORT construct, a hierarchical data structure is traversed, starting from the root node. A TREE_SORT value for a root node is generated by transforming a Peer_Sequence value of the root node to a left-justified string of a given width. Peer_Sequence values identify a sequential order of nodes that have the same parent in a hierarchical data structure. Peer_Sequence values are monotonically increasing among the children of the same parent.

According to an embodiment of the present invention, TREE_SORT values for other nodes in tree data structure are generated as follows: Peer_Sequence values for children nodes are transformed to a left-justified substring of characters of a given width, and a TREE_SORT value of the parent node is prepended to the left of the generated substring of the transformed Peer_Sequence value. The resulting TREE_SORT value for a given node, other than the root node, includes the following components: a leading substring that represents a TREE_SORT value of the parent node and the transformed Peer_Sequence value for that node. Thus, the TREE_SORT value represents the chain of Peer_Sequence values starting from the root node of the tree data structure and going down to the specific node.

Importantly, the generated TREE_SORT values are ordered according to the same collating sequence as Peer_Sequence values. A collating sequence is an ordering system that determines whether a particular character sorts higher, lower, or the same as another. Thus, if a Peer_Sequence of node A is ordered before a Peer_Sequence of the node B, the transformed value of the Peer_Sequence of node A is ordered before the transformed value of the Peer_Sequence for node B.

In a preferred embodiment of the present invention, the generated TREE_SORT values are of a STRING data type. As a result, the present invention advantageously uses SQL string-type functions, such as SORT (ORDER BY) and LIKE, to efficiently traverse across multiple levels of a hierarchical data structure. When a tree data structure is sorted according to a TREE_SORT construct, descendant nodes of a particular node have TREE_SORT values that sort after the common ancestor's TREE_SORT value. This observation allows the system to execute efficient queries to, for example, identify ancestors or descendants of a given node, or the next node in the hierarchy, and yet to avoid traversing across multiple levels of a hierarchical data structure using a pointer-chain traversal.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

1. System Architecture Overview

Figure 2:
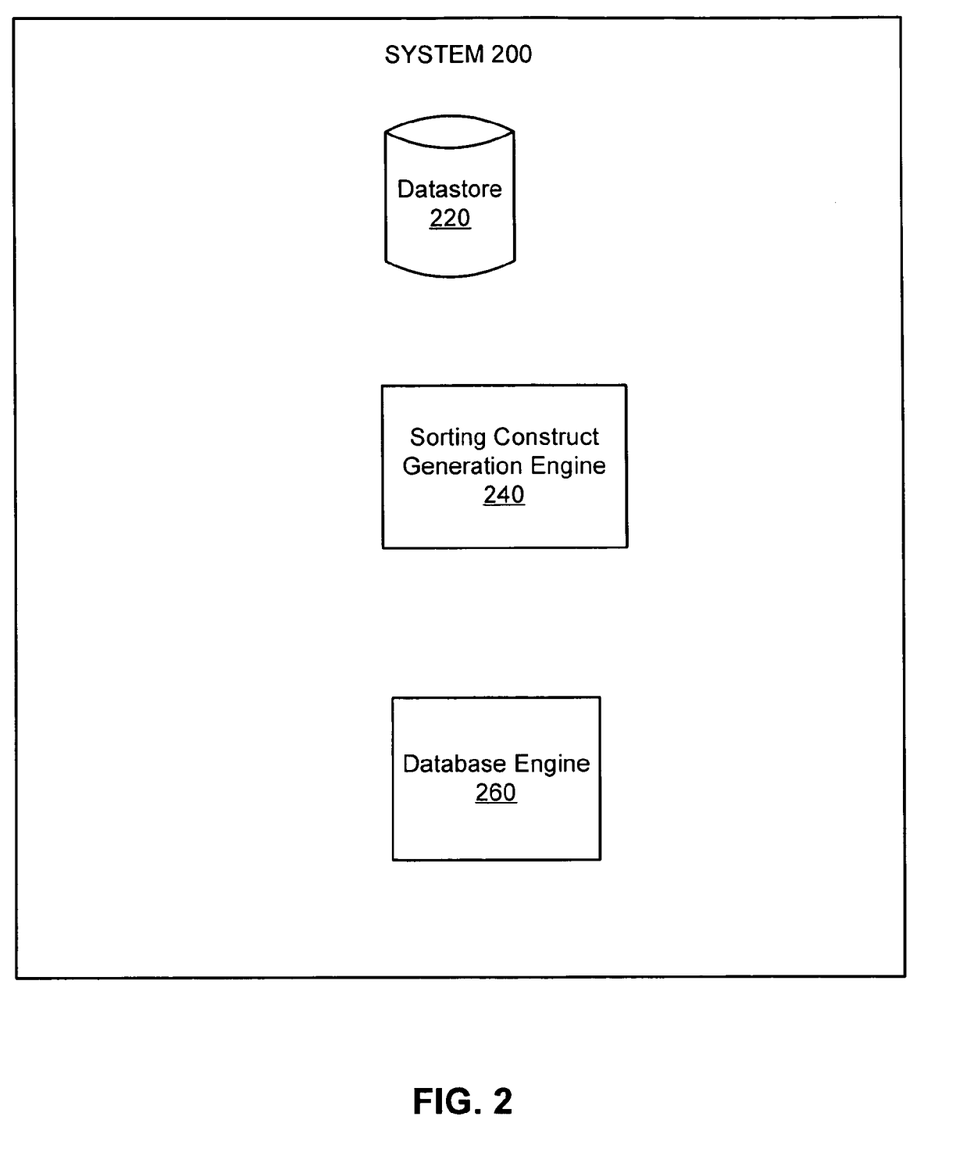
FIG. 2 is a block diagram of a system for providing efficient indexing of hierarchical data in relational databases according to an embodiment of the present invention.

FIG. 2 is a block diagram of system 200 for providing efficient indexing of hierarchical data in relational databases according to an embodiment of the present invention. System 200 includes a data store 220, a sorting construct generation engine 240, and a database engine 260.

Data store 220 holds database having records. In one embodiment, when system 200 is implemented in a healthcare environment, data store 220 maintains medical records. Data store 220 can be implemented, for example, as a relational database management system (RDMBS), and queries to the data store 220 are accomplished via SQL. An example of a relational database representation of the tree structure illustrated in FIG. 1 was shown in Table 1.

Sorting construct generation engine 240 is adapted to generate sorting constructs TREE_SORT using transformed Peer_Sequence values according to an algorithm, which will be described in greater detail in the "Methods of Operation" section. Peer_Sequence values represent a sequential ordering among siblings of the node having the same parent. Briefly, the generated TREE_SORT is an ordered construct of a fixed width ordered according to the same system as the transformed Peer_Sequence values. In a preferred embodiment, TREE_SORT construct is of a STRING data type. Using a TREE_SORT construct allows system 200 to efficiently sort and retrieve data in a hierarchical data structure.

Database engine 260 is adapted to use generated TREE_SORT constructs to execute efficient queries on data store 220. Operations performed by database engine 260 will be described in more detail below in the "Methods of Operation" section.

In one embodiment, engines 220, 240, and 260 are implemented as modules. As used herein, the term "module" refers to computer program code adapted to provide the functionality attributed to the module. The program code is embodied in a random access memory (RAM), a read-only memory (ROM) or other media.

2. Methods of Operation

Generation of TREE_SORT Construct

As was previously described, engine 240 generates TREE_SORT constructs using Peer_Sequence values. At this point, it is beneficial to describe the Peer_Sequence value and its transformed value in greater detail.

As indicated earlier, a Peer_Sequence value represents a sequential ordering of siblings of the same node. The Peer_Sequence value can be any value capable of being transformed into a fixed-length string having a given width. Peer_Sequence values are monotonically increasing among children of a given parent. A given instance of engine 240 will transform Peer_Sequence into a fixed-length value that maintains the same ordering among its peers, but is of a sortable and concatenable data type. Transformed Peer_Sequence values are capable of being ordered according an ordering system that determines whether a particular character sorts higher, lower, or the same as another. Such an ordering is referred to as "collating sequence". In one embodiment, transformed Peer_Sequence values are ordered according to the American Standard Code for Information Interchange (ASCII). In another embodiment, both the Peer_Sequence and the transformed Peer_Sequence are ASCII. In another embodiment, transformed Peer_Sequence values are ordered according to the Unicode system. As was previously described, the Peer_Sequence value of the first node among siblings of the same parent can indicate the default interval by which the Peer_Sequence value of a subsequent sibling will be incremented. For example, if the Peer_Sequence of the first sibling is "10", the Peer_Sequence value for each subsequent sibling node is incremented by "10".

Figure 3:
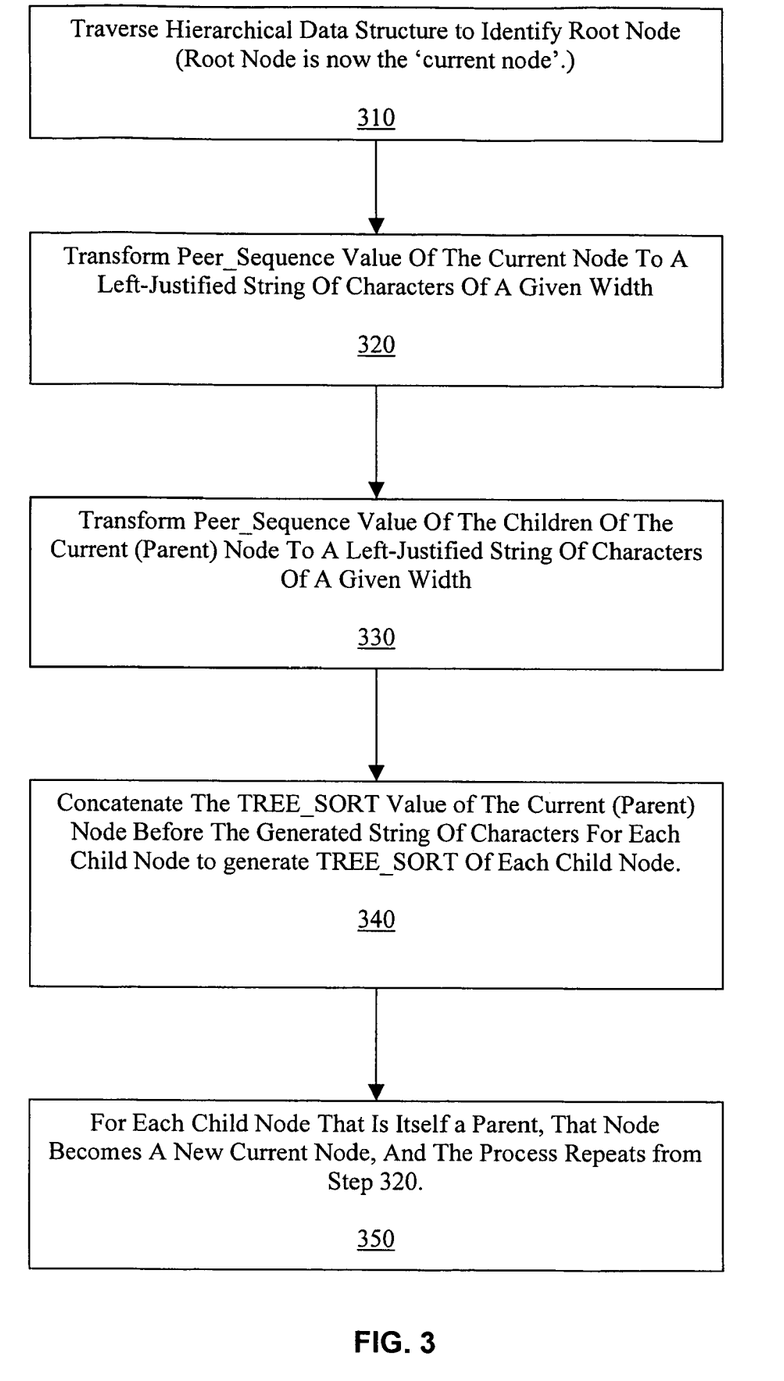
FIG. 3 is a flow diagram of the steps performed by the present invention.

Referring now to FIG. 3, a flow diagram of a method for generating a TREE_SORT construct is described. At this point, it is beneficial to describe properties of the TREE_SORT construct. In a preferred embodiment, a TREE_SORT construct is defined as a STRING data type. The STRING data type can be of a CHARACTER (CHAR) and CHARACTER VARYING (VARCHAR) data type. If TREE_SORT is of a CHAR data type, a fixed number of characters are allocated for the TREE_SORT field that stores a TREE_SORT value. If the length of the TREE_SORT value is shorter than the fixed length of the allocated TREE_SORT field, in one implementation, the remaining characters of the TREE_SORT value are filled, to the right of the generated value, with characters that sort before text characters and digital characters. In one implementation, the remaining characters are filled with blank characters.

In another implementation, when TREE_SORT is of a VARCHAR data type, a maximum length of the TREE_SORT field is specified. The length of the TREE_SORT construct (LENGTH) is a product of a given width and the maximum number of levels (MAX_LEVEL) in the hierarchy. For example, if the width is 2 and the maximum number of levels is 15, the LENGTH of the TREE_SORT construct is 30. Alternatively, in another implementation, if the transformed Peer_Sequence value of the root node is not included in the TREE_SORT to avoid redundancy, the length of the TREE_SORT construct is a product of the (MAX_LEVEL-1) and width. For example, a width of 3 and a length of 120 would result in a table that could support up to 41 hierarchical levels. The width indicates the number of children that any given node can have. For example, a width of 3 indicates that a given node can have up to 999 immediate children (if each transformed Peer_Sequence value is expressed only using digit characters); a width of 2 indicates that a given node can have up to 99 children.

Continuing with the description of FIG. 3, at step 310, to generate a TREE_SORT construct, the method traverses the hierarchical data structure, such as the one shown in FIG. 1, from the root node. To determine whether the node is the root node, the method determines whether the node has a parent. To this end, in one embodiment, the method determines whether the Parent_OID of the node is NULL.

In one implementation, the method converts 320 the Peer_Sequence value of the root node to a left-justified substring of characters of a given width. If TREE_SORT field is defined as a CHAR data type, and the length of the transformed substring is shorter than the specified fixed length of the field, the method adds suffix padding characters that sort before text characters and digital characters when an SQL-like function is applied.

The following example will illustrate the implementation of this method. In the following example, WIDTH=2, MAX_LEVEL=5, LENGTH=WIDTH×MAX_LEVEL=2×5=10, and INTERVAL=1. First, the root node, Alpha, is identified as the node that has no parent node. In one implementation, the Parent_OID of the root node=NULL. This node is indexed by OID=100. The Peer_Sequence value for this node is "1."

According to the method, in one implementation, the Peer_Sequence value "1" is converted to a left-justified substring of characters of WIDTH=2. In one implementation, if the TREE_SORT field is of a CHAR data type, characters that sort before text and digital characters are added to the right of the generated substring since the length of the transformed value is shorter than the fixed length (10) of the TREE_SORT field. In this example, the transformed Peer_Sequence string value is "01", and the generated TREE_SORT construct is "01xxxxxxxx", wherein "x" represents a character that sorts before text and digital characters and that is being added to the transformed Peer_Sequence values to make the length of the construct equal to the fixed length of the TREE_SORT field. In one implementation, "x" is a blank character (space).

The process then generates 320 TREE_SORT of the children of the root node. To this end, the process identifies nodes having their Parent_OID equal to the OID of the root node. The process then generates the TREE_SORT for the children nodes in the following manner:

1. The process converts 330 Peer_Sequence values for children nodes to a left-justified substring of characters of a given width;

2. The process then concatenates 340 the TREE_SORT of the root node with the generated substring of the transformed Peer_Sequence value. The process continues 350 until TREE_SORT values for all nodes in the tree are generated. In one implementation, the process uses the PREPEND function to add the TREE_SORT of the root node to the left of the transformed Peer_Sequence value for the child node.

Continuing with the same example, the process generates a TREE_SORT for all children of that node. As shown in FIG. 1, Alpha node has the following children: Bravo, Charlie, and Juliet. The process converts the Peer_Sequence of Bravo to "01", Peer_Sequence of Charlie to "02", and Peer_Sequence of Juliet to "03."

The process then prepends the TREE_SORT value for Alpha (the parent node of Bravo, Charlie, and Juliet) to the left of the TREE_SORT for each of these nodes. As a result, the generated TREE_SORT for nodes Bravo, Charlie, and Juliet are "0101", "0102", and "0103" respectively.

Continuing with the same example, Bravo, Charlie, and Julie have their own set of children, each with its own set of Peer_Sequence values. For example, Delta is a child of Bravo. The Peer_Sequence value of Delta is "1". The transformed Peer_Sequence of Delta is "01". The TREE_SORT of Delta is determined by prepending the TREE_SORT of its immediate parent, Bravo, with the transformed value of "01". As a result, the generated TREE_SORT for Delta is "010101".

Table 2 illustrates a relational database representation of the hierarchical data structure shown in FIG. 1 that includes a TREE_SORT field. In Table 2, the WIDTH of the generated TREE_SORT is 2. Peer_Sequence values start at 1 and have an interval of 1 for each subsequent child of a given parent.

TABLE 2

Relational Database Representation of a Hierarchical Data Structure After Adding TREE_SORT construct

| OID | Parent OID | Peer Sequence | Level | TREE SORT | DATA |
|-----|------------|---------------|-------|-----------|---------|
| 100 | none | 1 | 1 | '01' | Alpha |
| 200 | 100 | 1 | 2 | '0101' | Bravo |
| 300 | 100 | 2 | 2 | '0102' | Charlie |
| 400 | 200 | 1 | 3 | '010101' | Delta |
| 600 | 300 | 1 | 3 | '010201' | Echo |
| 500 | 300 | 2 | 3 | '010202' | Foxtrot |
| 700 | 500 | 1 | 4 | '01020201' | Golf |
| 800 | 500 | 2 | 4 | '01020202' | Hotel |
| 900 | 700 | 1 | 5 | '0102020101' | India |
| 1000 | 100 | 3 | 2 | '0103' | Juliet |

Thus, as shown in Table 2, in a preferred embodiment, a TREE_SORT construct of the root node (Alpha) in the hierarchical data structure includes a leading substring that represents a transformed Peer_Sequence value. A TREE_SORT value of the nodes other than the root node includes the following components: a leading substring that represent a TREE_SORT value of the parent node, and the transformed Peer_Sequence value for that node. Thus, a TREE_SORT construct for a particular node represents the chain of Peer_Sequence values starting from the root of the tree structure and going down to the specific node.

Importantly, the generated TREE_SORT values are ordered according to the same collating sequence as the transformed Peer_Sequence values so that if Peer_Sequence value A is ordered before Peer_Sequence value B, the transformed value of the Peer_Sequence value A sorts before the transformed value of the Peer_Sequence value B. In a preferred embodiment of the present invention, TREE_SORT values and Peer_Sequence values are ordered according to the collating sequence defined by the ASCII system. According to the ASCII collating system, smaller numeric characters are sorted before greater numeric characters; text characters are sorted in alphabetical order; and blank symbols are sorted before all numeric and text characters. One skilled in the art would understand that Peer_Sequence values can be sorted according to any other system in which any subsequent value is increasing monotonically.

In other implementations, to avoid redundancy, the TREE_SORT value of all the nodes omits from the TREE_SORT value the string portion that would have been derived from the root node's Peer_Sequence.

Since in the preferred embodiment, the generated TREE_SORT values are of a STRING data type, the present invention advantageously uses SQL string-type functions, such as SORT (ORDER BY) and LIKE, to traverse across multiple levels of a hierarchical data structure. As was previously indicated, a TREE_SORT value for a given node, other than a root node, includes a leading substring that represents a TREE_SORT value for a parent node and the transformed Peer_Sequence value for that node. When a tree data structure is sorted according to a TREE_SORT construct, descendant nodes of a particular node have a TREE_SORT that sorts after the TREE_SORT value of their common parent node. A node is a common parent for two child nodes if Parent_OID for these nodes equal to OID of that parent.

The following example will illustrate the described concept. Continuing with the example illustrated in Table 2, TREE_SORT of Bravo is "0101". TREE_SORT of Delta (Bravo's child) is "010101." In this example, TREE_SORT values are ordered according to the collating sequence of the ASCII system. As was previously noted, TREE_SORT of Delta comprises the following components: TREE_SORT of Bravo "0101" and transformed Peer_Sequence value of Delta "01". Similarly, TREE_SORT of Juliet comprises TREE_SORT of Alpha, "01", and transformed Peer_Sequence of Juliet, "03". When an SQL SORT (ORDER BY) query is issued, the TREE_SORT of Alpha ("01") sorts before TREE_SORT of Bravo, "0101", since characters that are added to the right of TREE_SORT of Alpha are sorted before numeric and text characters. Accordingly, "01" is sorted before "0101."

Similarly, TREE_SORT of Bravo, "0101", sorts before TREE_SORT of Juliet, "0103" because characters added to TREE_SORT of Bravo are sorted before numeric and text characters added to "0101."

Tree Display Ordering

As was previously described, often, a database user wants to produce a tree display of a hierarchical data structure. Existing solutions for accomplishing this task have been left for programmers since producing a tree display of a hierarchical data structure could not be accomplished with a single query with the given definition.

The present invention has overcome the limitations of the existing solutions by issuing a query that sorts elements of a hierarchical data structure according to TREE_SORT constructs. The TREE_SORT allows the following simple query to produce a tree display of a hierarchical data structure:

```
Select
Case
   When LEVEL = 1 Then DATA
   Else concat(Substring('++++++++++',1,LEVEL-1),DATA)
End,
TREE_SORT
From A_TREE
Order by TREE_SORT
```

The above query performed on the example illustrated in Table 2 will produce the following output:

| Alpha | 01 |
| +Bravo | 0101 |
| ++Delta | 010101 |
| +Charlie | 0102 |
| ++Echo | 010201 |
| ++Foxtrot | 010202 |
| +++Golf | 01020201 |
| ++++India | 0102020101 |
| +++Hotel | '01020202' |
| +Juliet | '0103' |

The '+' sign prefixing the DATA indicates that a given node is a child of the preceding node with fewer or no '+' signs. In the display list, descendant nodes of a given node have a TREE_SORT that sorts after the TREE_SORT of a common parent. Thus, descendants of Charlie, such as Golf and Hotel, sort after their common parent Foxtrot.

Examining Relationships Across Multiple Levels of a Hierarchical Data Structure

To find all descendants of a target node in a hierarchical data structure, a simple query will be issued that identifies nodes having a TREE_SORT value with a leading substring that matches the TREE_SORT of the target node.

For example, an efficient query to find all the descendants of Charlie (whose TREE_SORT='0102') would find all descendants having a TREE_SORT with a leading substring equal to the TREE_SORT value of Charlie. The following query will be issued:
Select DATA from A_TREE
where TREE_SORT like "0102%"

This query produces the following output: Echo, Foxtrot, Golf, Hotel, and India. Thus, using a TREE_SORT construct to retrieve and sort data in a hierarchical data structure is advantageous over prior art solutions that would require performing a pointer-chain traversal to find all nodes having a Parent_OID equal to the OID of Charlie or that of Charlie's child. Accordingly, a TREE_SORT construct avoids the complexities of navigating the tree data structure.

To retrieve all ancestors of a target node in a hierarchical data structure, a simple query will be issued that identifies nodes having a TREE_SORT value that match a leading substring of the target node.

To find out if a given node is descendant of a target node, a simple query will be issued to determine whether a leading substring of the TREE_SORT of the given node matches the TREE_SORT of the target node.

To find out if a given node is an ancestor of a target node, a simple query will be issued to determine whether the TREE_SORT value of the given node matches the leading substring of the target node.

For example, find out if India a descendant of Charlie?" using the generated TREE_SORT construct, a database user needs to issue a query to find out if the TREE_SORT of Charlie is the leading substring of the TREE_SORT of India. An exemplary SQL query fragment is shown below:
"where substring (India.TREE_SORT,1,length (Charlie.TREE_SORT))=Charlie.TREE_SORT"

Database engine 260 executes this query as follows. Database engine 260 parses the TREE_SORT value of India to identify a leading substring that starts with the first position and has the length of the Charlie's TREE_SORT construct (four characters). TREE_SORT of India is '0102020101' and TREE_SORT of Charlie is '0102'. The first four characters of TREE_SORT of India are '0102'. Accordingly, Charlie is a direct ancestor of India. Thus, using a TREE_SORT construct allows system 200 to efficiently retrieve and sort data in a hierarchical data structure thereby avoiding performing convoluted pointer-chain traversal queries.

Alternative Embodiments

It should be noted that although Table 2 illustrates database representation of one hierarchical data structure, one of skill in the art would understand that multiple hierarchies can be stored in one database table. In such an implementation, a MASTER_OID field is added to the table to identify nodes of a particular hierarchy within the table so that all nodes within a given hierarchy have the same MASTER_OID value. Other implementations of the present invention store in a TREE_SORT field only transformed Peer_Sequence value of the ancestors of a particular node but omit the TREE_SORT value of the root node to avoid redundancy.

To query nodes of a given tree structure identified by a unique MASTER_OID from the database table that stores multiple hierarchies, database engine 260 issues the following query to select records indexed by, for example, MASTER_OID=100 and ordered by TREE_SORT:
Select * from MANY_TREES
where MASTER_OID=100
order by TREE_SORT To retrieve all descendants of a target node from a database table that stores multiple hierarchies, database engine 260 uses MASTER_OID and the leading substring of TREE_SORT of the target to obtain those results. For example, when the target node is Charlie, the following query is issued:
Select * from MANY_TREES
where MASTER_OID=100
and TREE_SORT like '0102%'

In the above query, '0102%' is Charlie's TREE_SORT value with the '%' the SQL string march operator tacked on. Charlie's descendants are nodes having TREE_SORT values with a leading substring that matches Charlie's TREE_SORT. In other words, their TREE_SORT values start with the TREE_SORT value of Charlie.

Thus, a TREE_SORT construct is used to efficiently query data store 220 that holds database records for multiple hierarchical data structures.

Adding Nodes to the Hierarchical Data Structure

According to an embodiment of the present invention, adding new nodes to a tree data structure involves creating a new OID, Parent_OID, and Peer_Sequence. To this end, it is desirable to set the interval for Peer_Sequence such that new sibling nodes can be added. However, if there is not enough room to add a new Peer_Sequence value or the Interval=1, opening up a place for a new node involves renumbering Peer_Sequence values. The scope of this renumbering of Peer_Sequence is limited to the siblings of the new node having the Peer_Sequence value greater than that of the new node. The changes to the TREE_SORT values involve changes to the TREE_SORT for those siblings and their descendants.

XML Database Representation

One application of the TREE_SORT construct is for traversing XML documents. An XML document includes a plurality of elements that are organized in a hierarchical order. An element in the XML document may be associated with a value. A root element is the topmost element in the document that has no ancestor elements. An XML document also has leaf elements and internal elements. An internal element is an element that has one or more child elements. A leaf element has no children. All children of the same element are siblings.

An exemplary XML document is shown bellow.

```
<Alpha URL="http://www.nowhere.nohow.fake/example.xml">
  <Bravo>
    <Delta>Hello There</Delta>
  </Bravo>
  <Charlie>
    <Echo>Again</Echo>
    <Foxtrot>
      <Golf>
        <India>500.5</India>
      </Golf>
      <Hotel>No Tell</Hotel>
    </Foxtrot>
  </Charlie>
  <Juliet></Juliet>
</Alpha>
```

In the XML document shown above, Alpha, Bravo, Delta, etc. are elements. Alpha is a root element in the hierarchy; "Bravo" and "Charlie" are children of Alpha. Thus, Bravo and Charlie are siblings. In the XML document, Delta has a value of "Hello There", and Echo has the value "Again."

Referring again to FIG. 1, elements of the XML document shown above are illustrated in the hierarchical data structure shown in FIG. 1. Each element is identified by its OID, the Parent_OID, Level, and the Peer_Sequence value.

The above XML document can be represented as records in a relational database. The representation of the XML document in the relational database is shown below in Table 3.

TABLE 3

Representation of XML Document in Relational Database

| OID | Peer Sequence | LEVEL | ELEMENT NAME | ELEMENT VALUE |
|---|---|---|---|---|
| 100 | 1 | 1 | Alpha | |
| 200 | 1 | 2 | Bravo | |
| 300 | 2 | 2 | Charlie | |
| 400 | 1 | 3 | Delta | Hello There |
| 600 | 1 | 3 | Echo | Again |
| 500 | 2 | 3 | Foxtrot | |
| 700 | 1 | 4 | Golf | |
| 800 | 2 | 4 | Hotel | No Tell |
| 900 | 1 | 5 | India | 500.5 |
| 1000 | 3 | 2 | Juliet | |

As shown in Table 3, each record has a plurality of fields. The DATA field has been expanded into ELEMENT_NAME, ELEMENT_VALUE, ATTRIBUTE_NAME (not shown), ATTRIBUTE_SEQUENCE (not shown) and ATTRIBUTE_VALUE (not shown). Other fields in the Table are the OID, the Parent_OID, and Level.

According to an embodiment of the present invention, sorting construct generation engine 240 uses the Peer_Sequence value for each element in the XML document to generate TREE_SORT constructs according to an algorithm described earlier. Table 4 below illustrates representation of the XML document in the database table with generated TREE_SORT values.

TABLE 4

Representation of XML document in Relational Database with TREE_SORT construct

| OID | Peer Sequence | LEVEL | TREE SORT | ELEMENT NAME | ELEMENT VALUE |
|---|---|---|---|---|---|
| 100 | 1 | 1 | '01' | Alpha | |
| 200 | 1 | 2 | '0101' | Bravo | |
| 300 | 2 | 2 | '0102' | Charlie | |
| 400 | 1 | 3 | '010101' | Delta | Hello There |
| 600 | 1 | 3 | '010201' | Echo | Again |
| 500 | 2 | 3 | '010202' | Foxtrot | |
| 700 | 1 | 4 | '01020201' | Golf | |
| 800 | 2 | 4 | '01020202' | Hotel | No Tell |
| 900 | 1 | 5 | '0102020101' | India | 500.5 |
| 1000 | 3 | 2 | '0103' | Juliet | |

Although in a preferred embodiment of the present invention, system 200 generates a TREE_SORT construct of a string data type to benefit from string-type functions of the SQL to efficiently query hierarchical data structures represented in relational databases, a person skilled in the art would understand that a TREE_SORT construct can be of any data type to benefit from the capabilities of SQL sort-type functions to efficiently query hierarchical data structures.

A person skilled in the art would understand that the present invention could be utilized with respect to any type of data. Notably, the present invention can be used in healthcare information systems. For example, the present invention can be utilized in the following aspects of the management of healthcare information systems:

Evaluation and management coding. A TREE_SORT construct is used to perform evaluation and management aggregation and summary of obtained findings for a patient into the complex counts and categorizations within a single query.

Chartable Item Templates. A TREE_SORT construct can be used to efficiently portray and traverse hierarchical data structures and effectively use internal and external sub-trees; to portray expandable and collapsible lines in a flowsheet and to guide the interaction and charting from mini-forms for charting.

Aggregates. Using A TREE_SORT construct yields an effective and easy traversal of aggregates in healthcare systems.

Clinical Notes/Documents. A TREE_SORT construct is used for compact and efficient representation of composed phrases/sentences/paragraphs/sections since clinical documentation can be represented as hierarchical data structures.

Hierarchical Findings. A TREE_SORT construct is used to roll-up and perform dependency determination. The TREE_SORT construct allows for efficient use of hierarchical clinical context mini-trees to represent interconnected observations, and provides a bridge between post-coordination and the atomic medical event.

Hierarchical selection lists.

A TREE_SORT construct is used in general nomenclature subsets.

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet. Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

I claim:

1. A computer-implemented method for efficiently indexing a hierarchical data structure stored in a database, the method comprising:
    creating an instance of a database in which elements of a hierarchical data structure are in an ancestor-descendant relationship and an element is indexed by a peer sequence value that identifies sequential ordering of elements having a same parent;
    transforming the peer sequence value for a parent element into a sorting construct of a given width to generate the sorting tree construct of the parent element, wherein the sorting tree construct maintains the sequential ordering of the elements having the same parent;
    transforming the peer sequence value of a child element into a sorting construct of the given width, wherein the sorting construct of the child element maintains the sequential ordering of the child elements having the same parent; and
    prepending the sorting tree construct of the parent element to the left of the transformed peer sequence value of the child element to generate a sorting tree construct of the child element, wherein the peer sequence values and the sorting constructs are ordered according to the same collating sequence.

2. The method of claim 1, wherein peer sequence values are ordered according to the ASCII system.

3. The method of claim 1, wherein peer sequence values are ordered according to the Unicode system.

4. The method of claim 1, wherein the sorting construct is of a string data type.

5. The method of claim 1, further comprising adding characters to the sorting construct of a parent element, the added characters are sorted before text characters and digital characters.

6. The method of claim 1, wherein multiple hierarchical data structures are stored in the database.

7. The method of claim 1, wherein the hierarchical data structure describes an XML document.

8. The method of claim 1, wherein the length of the sorting construct is a function of a given width of the sorting construct and a maximum number of levels in the hierarchical data structure.

9. The method of claim 1, wherein peer sequence values are monotonically increasing among children of the same parent element.

10. A system for efficiently indexing a hierarchical data structure in a database, the system comprises:
    the database contained on a computer readable storage medium for storing a hierarchical data structure, wherein elements in the hierarchical data structure are in a parent-child relationship, wherein each child element is indexed by a peer sequence value that identifies sequential ordering of child elements having a same parent element;
    a sorting construct generation module contained on the computer readable storage medium for performing the steps of:
        transforming a peer sequence value for a parent element into a sorting construct of a given width to generate a sorting tree construct of the parent element, wherein the sorting tree construct maintains the sequential ordering of elements having the same parent,
        transforming a peer sequence value of a child element into a sorting construct of the given width, wherein the sorting construct of the child element maintains the sequential ordering of the child elements having the same parent, and
        prepending the sorting tree construct of the parent element to the transformed peer sequence value of the child element to generate a sorting tree construct of the child element, wherein the peer sequence values and the sorting constructs are ordered according to the same collating sequence.

11. The system of claim 10, further comprising a database engine module for efficiently executing queries to the database using the generated sorting construct.

12. The system of claim 10, wherein the database comprises a plurality of tables, and wherein a table in the database for storing multiple hierarchical data structures.

13. The system of claim 10, wherein the sorting construct generation module is further for adding characters to the sorting construct of a parent element, the added characters are sorted before text characters and digital characters.

14. The system of claim 10, wherein the sorting construct has a length, and the length of the sorting construct is a function of the given width of the sorting construct and a maximum number of levels in the hierarchical data structure.

15. A method for efficiently identifying a descendant of an element in a hierarchical data structure, the method comprising:
- creating an instance of a database in which elements of the hierarchical data structure are in an ancestor-descendant relationship and each element is indexed by a peer sequence value that identifies sequential ordering of elements having the same parent;
- generating a sorting construct for an element by transforming a peer sequence value for the element and prepending a leading substring, the leading substring is representative of a sorting construct of an ancestor of the element, wherein the peer sequence values and the sorting constructs are ordered according to the same collating sequence; and
- identifying elements in the data structure having a leading substring equal to the sorting construct of the element.

16. A method for efficiently identifying an ancestor of an element in a hierarchical data structure, the method comprising:
- creating an instance of a database in which elements of the hierarchical data structure are in an ancestor-descendant relationship and each element is indexed by a peer sequence value that identifies sequential ordering of elements having the same parent;
- generating a sorting construct for an element by transforming a peer sequence value for the element and prepending a leading substring, the leading substring is representative of a sorting construct of an ancestor of the element, wherein the peer sequence values and the sorting constructs are ordered according to the same collating sequence; and
- identifying elements in the data structure with the sorting construct equal to the leading substring of the element.

17. A computer program product comprising:
- a computer-readable medium having computer program code embodied therein for efficiently indexing a hierarchical data structure in a database, the computer program code adapted to:
- create an instance of a database in which elements of a hierarchical data structure are in an ancestor-descendant relationship and an element is indexed by a peer sequence value that identifies sequential ordering of elements having a same parent;
- transform a peer sequence value for a parent element into a sorting construct of a given width to generate a sorting construct of the parent element, wherein the sorting construct maintains the sequential ordering of the elements having the same parent;
- transform a peer sequence value of a child element into a sorting construct of the given width, wherein the sorting construct of the child element maintains the sequential ordering of the child elements having the same parent; and
- prepend the sorting construct of the parent element to the left of the transformed peer sequence value of the child element to generate a sorting tree construct of the child element, wherein the peer sequence values and the sorting constructs are ordered according to the same collating sequence.

\* \* \* \* \*